United States Patent

[11] 3,608,933

[72] Inventor William T. Lee
 Houston, Tex.
[21] Appl. No. 852,173
[22] Filed Aug. 22, 1969
[45] Patented Sept. 28, 1971
[73] Assignee Bowen Tools, Inc.

[54] LOCK RING ASSEMBLY FOR LOCKING THREADED SHOULDERED JOINTS
 8 Claims, 7 Drawing Figs.
[52] U.S. Cl. .................................................. 285/39,
 285/89, 285/334, 151/34
[51] Int. Cl. .................................................. F16l 15/00
[50] Field of Search .......................................... 285/92, 89,
 81, 82, 333, 334, 39; 151/34

[56] References Cited
 UNITED STATES PATENTS
 1,349,518 8/1920 Lyle .............................. 285/89
 2,931,670 4/1960 Church ......................... 285/81

FOREIGN PATENTS
 514,923 11/1939 Great Britain ................ 151/34

Primary Examiner—Thomas F. Callaghan
Attorney—Pravel, Wilson & Matthews

ABSTRACT: A lockring assembly for resisting disconnecting torque in a threaded coupling for connecting adjacent pipes wherein such assembly includes a pair of circular members adapted to be positioned between opposed shoulders in the coupling and wherein the circular members have outer gripping surfaces for gripping the opposed shoulders when the threaded connection is tightened together. The circular members also include interengaging cam surfaces which mesh together upon such tightening and which urge the pipes axially apart as they are rotated in a disconnecting direction relative to each other to thereby resist such rotation. The invention also includes means for holding the circular members against rotation relative to each other to prevent such intermeshing cam surfaces urging the threaded joints axially apart to thereby avoid interference with loosening and disconnecting such pipes.

PATENTED SEP 28 1971

William T. Lee
INVENTOR

BY

Pravel Wilson & Matthews
ATTORNEYS

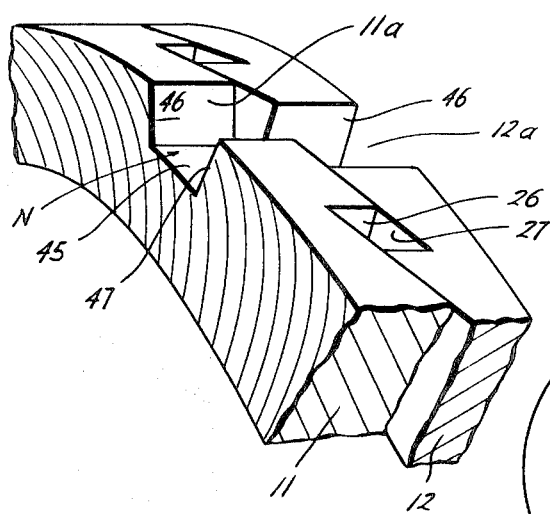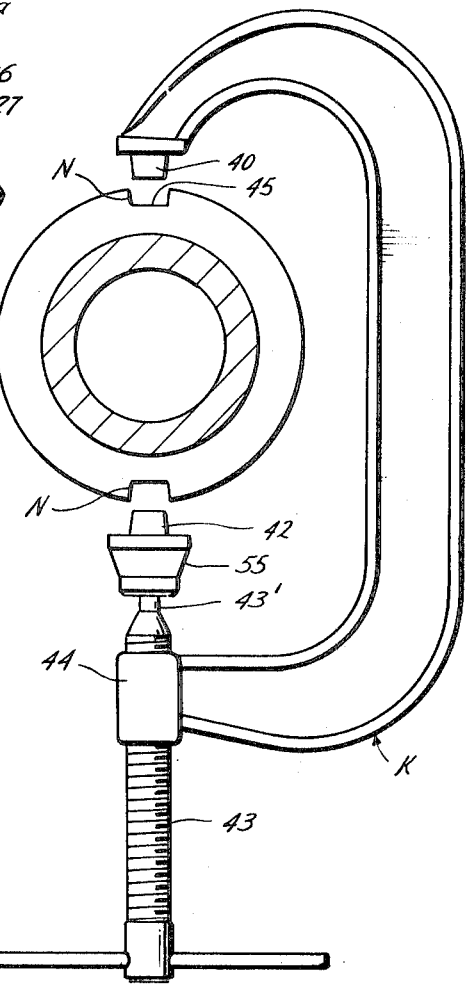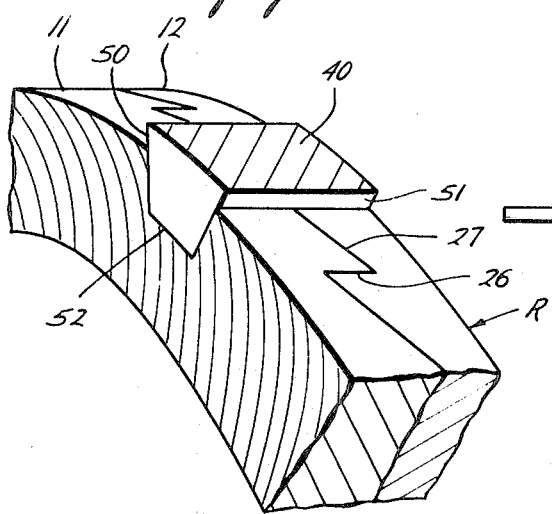

LOCK RING ASSEMBLY FOR LOCKING THREADED SHOULDERED JOINTS

BACKGROUND OF THE INVENTION

1. Field of the Invention

The invention relates to locking devices for locking tubular members that are threaded together, such as adjacent joints in a string of drill pipe; a joint of pipe and some special tool, such as a top sub on an overshot, a wash pipe, a jar, bumper subs and the like, to resist or prevent loosening of such threaded connections when subjected to high torque forces in a disconnecting direction.

2. Description of the Prior Art

The pertinent prior art locking devices presently known to applicant include devices such as that disclosed in U.S. Pat. No. 3,263,727 to Herpolsheimer and U.S. Pat. No. 3,329,190 to Oldenkott; however, these devices are both lockwashers intended for use in locking a nut onto a bolt and have serious limitations which render them impractical for locking together threaded tubular members such as are used in oil well drilling and the like. The device of Oldenkott has a noncircular periphery with a plurality of radial projections which are required for releasing. Such projections are unsuited for use with oil well tubular members because such projections would extend outwardly beyond the cylindrical surface of the oil well tools or drill pipe and obstruct the well bore and also interfere with rotation or free longitudinal movement of a string of pipe in a well bore. Although the lockwasher arrangement of Herpolseimer includes a circular ring with no external projections that would extend beyond the outer cylindrical surface of the tubular oil well members and interfere with movement of a pipe in a well bore, that device does not include means for holding the washers to facilitate disconnection of the locked together members which is frequently required with tubular members that are used in oil well drilling operations and the like. On the other hand, the present invention provides locking rings which are suitable for use in connecting threaded oil well tubular members together or to a string of drill pipe and also includes a positive means for readily releasing the lock assembly to facilitate repeated loosening or disconnecting of such tubular members when desired.

SUMMARY OF THE INVENTION

The present invention provides a new and improved lockring assembly wherein a pair of locking members are provided for use between the opposing shoulders formed adjacent the threaded end portions in a male-and-female-type joint. Such locking members include outer gripping surfaces for gripping the laterally extending opposed shoulders formed adjacent the threaded ends of the pipes and inner cam surfaces which are adapted to be moved axially apart as they are rotated in a disconnecting direction to transmit a force axially of the threaded connection to thereby resist such disconnecting torque.

Another object of the present invention is to provide a new and improved lockring assembly for use in locking oil well tools together or to a drill string or the like wherein the locking ring assembly includes a pair of ring members having knurled exterior faces for engaging and gripping the opposed shoulders on the tabular members on which such locking assembly is used to transmit torque from each tubular member to the locking ring immediately adjacent thereto, and cam surfaces on the inner or facing surfaces of the locking rings for urging such tubular members axially apart in response to disconnecting torque forces in such members, to resist such forces. The present invention also includes a plurality of circumferentially spaced notches in the locking rings for receiving clamping means for clamping such rings against rotation relative to each other to prevent disconnecting torque from being transmitted axially of the tools to thereby prevent such locking rings from resisting disconnecting torque when desired.

BRIEF DESCRIPTION OF THE DRAWINGS

FIG. 5 is a partial isometric view of the locking rings in the expanded position and showing the circumferentially spaced notches out of alignment with each other;

FIG. 6 is a view showing the locking rings in a C-clamp with lugs in position for engaging the notches in the locking rings to secure the rings against rotation relative to each other; and FIG. 7 is an isometric sectional view showing a portion of a C-clamp lug inserted into aligned notches on the locking rings for holding such rings against relative rotation.

DESCRIPTION OF THE PREFERRED EMBODIMENT

Figure 1:
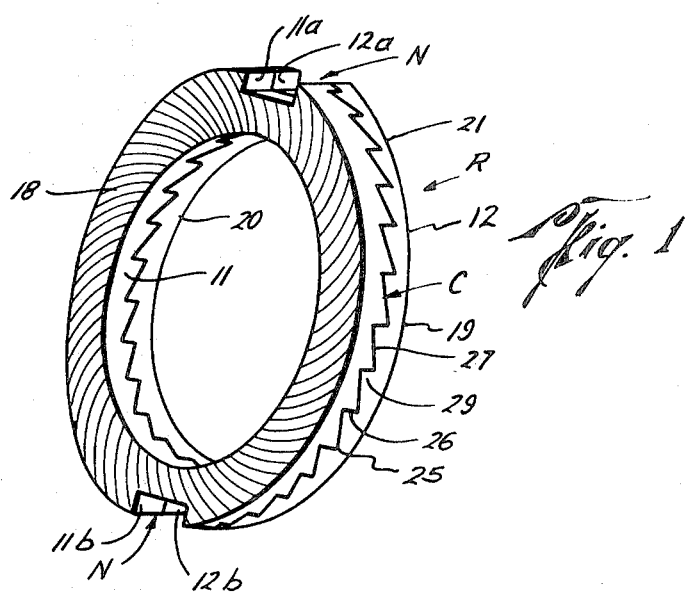
FIG. 1 is an isometric view showing the locking rings of the present invention with the interengaging cam surfaces meshed together in the tightened position.

The lock ring assembly of the present invention, designated generally R in the drawings, is adapted to be positioned between the opposed shoulders S1 and S2 that are formed adjacent the threaded end portions of tubular members or pipes, P1 and P2, that are threaded together end-to-end. It will be appreciated that such tubular members P1 and P2 could be joints of pipe in a drill string or any connection between tubular members such as a string of pipe and a well tool, a string of pipe and a top sub on an overshot, a wash pipe and a well tool, a string of pipe and a top sub on an overshot, a wash pipe, jars, bumper subs or the like, which are normally used in oil well drilling operations. Such lockring assembly R includes interengaging cam surfaces C which are adapted to impart an axial load to the threaded connection between tubular members P1 and P2 when such members are rotated in the direction for disconnection to resist or prevent unintentional loosening of such connection.

As best seen in FIG. 1 of the drawings, the lockring assembly has a plurality of circumferentially spaced notches N which are provided for receiving a breakout clamp K shown in FIG. 6 of the drawings for holding the rings in the assembly against rotation relative to each other to prevent such rings from restricting disconnecting rotation when disconnection of the pipes P1 and P2 is desired.

Considering now the apparatus of the present invention in more detail, the lockring assembly R comprises a pair of circular members 11 and 12 which are adapted to extend circumferentially of the base portion of the pin 16 on which the male threads 17 are formed. The circular members 11 and 12 are provided with annular knurled surfaces 18 and 19 for engaging and gripping the opposed annular shoulders S1 and S2, respectively, formed on the connected members P1 and P2. Such circular members 11 and 12 are formed with generally concentric circular inner and outer surfaces 20 and 21, respectively. It will be appreciated that the inner diameter of the circular members 11 and 12 is slightly larger than the external diameter of the base portion 14 of the pin 16 and that the external diameter of such circular members 11 and 12 is approximately the same as the external diameter of the tubular members P1 and P2 adjacent such shoulders S1 and S2, respectively. The circular members 11 and 12 are formed with notched out portions 11a and 12a, respectively, on one side and 11b and 12b on the opposite side, so as to form the notches N when the circular members 11 and 12 are positioned with the cam surfaces C rotated together, as shown in FIG. 1 of the drawings.

With this arrangement, the knurled surfaces 18 and 19 provide substantially full engagement with the laterally extending shoulders S1 and S2 with the exception for the small notched out areas 11a, 11b, 12a and 12b, and yet do not project radially outwardly beyond the external cylindrical surface of the tubular members P1 and P2 so as not to interfere with the movement in a well bore of the tool with which such members 11 and 12 are used.

Such circular members 11 and 12 are also formed with facing interengaging or meshing cam surfaces C which are formed on the opposite side of the rings 11 and 12 from the knurled surfaces 18 and 19. Such cam surfaces include a plurality of circumferentially arranged cam teeth 25 having a substantially longitudinally extending surface 26 and an inclined surface 27 which is inclined in the same direction as the pitch of the threads 17, but which is preferably provided with a greater pitch than such threads which connect the tubular members P1 and P2 together.

Figure 2:
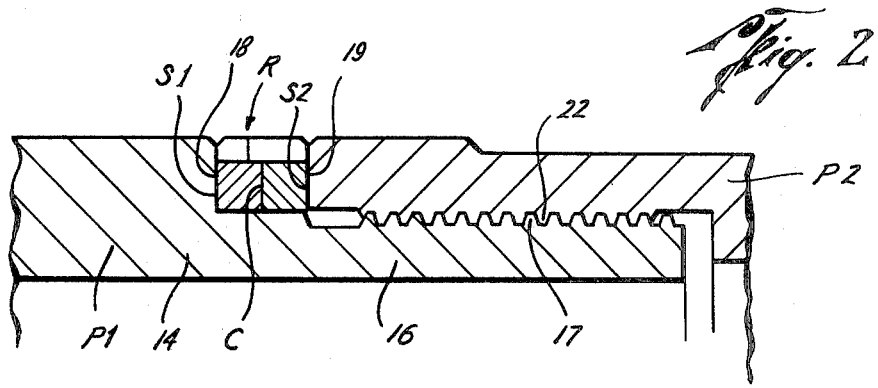
FIG. 2 is a partial sectional view of the male-and-female thread portions of a pipe joint screwed together in a tightened position with the locking rings disposed between opposed shoulders formed adjacent the threaded portions.

As shown in FIG. 2 of the drawings, when threads 17 are tightened into the female threads 22 in the box end portion 23 of the member P2, the knurled surfaces 18 and 19 bite into the adjacent annular shoulders S1 and S2 and grip shoulders so that upon subsequent disconnecting rotation of such members P1 and P2, the rings 11 and 12 will tend to rotate therewith.

Figure 4:
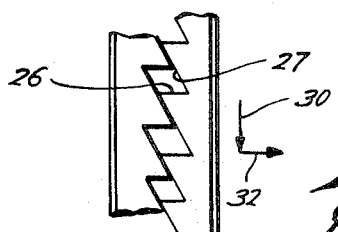
FIG. 4 is a side view of the locking rings as shown in FIG. 3 in the expanded position.

As such rings 11 and 12 rotate in a disconnecting direction indicated by the arrow 20 in FIG. 4 of the drawings, the inclined surfaces 27 force the rings 11 and 12 laterally apart and impart an axial force on the threads 17 and 22 in the direction indicated by the arrow 32 to resist further loosening or turning in the direction of disconnection.

When it is desired to disconnect the threaded portions 17 and 22, the tubular members P1 and P2 are rotated in the tightening direction opposite to the direction indicated by the arrow 20 so as to move the rings 11 and 12 from an expanded position as is shown in FIG. 5, into the tightened position shown in FIG. 7, with the notches N in each ring 11 and 12 aligned with each other. Thereafter, a breakout clamp K, which preferably has a fixed lug or projection 40 and a movable lug 42 mounted on the threaded shaft 43 is positioned with the lug 40 in one pair of the aligned notches N on one side of the rings 11 and 12 and the lug 42 in the other pair of notches N. The shaft 43 is mounted in an internally threaded opening in a sleeve 44 of the clamp K and is adapted to move the movable lug 42 towards or away from the fixed lug 40 so as to clock such lugs 40 and 42 in the diametrically opposite notches N of the aligned rings 11 and 12.

The notches N are preferably V-shaped openings having a transverse base 45 with upwardly and outwardly inclined sides 46 and 47. As best seen in FIGS. 6 and 7 of the drawings, the lugs 40 and 42 are preferably wedge shaped and have tapered or converging sides 50 and 51 which are tapered or inclined at substantially the same angle as the sides 46 and 47 of the notches N and a transverse base surface 52 connecting such sides 50 and 51.

The lug 42 is mounted on a base 55 that is rotatably secured to the inner end 43' on the threaded shaft 43 so that as the shaft 43 is rotated to move the projection 42 inwardly into the aligned notches N, the wedge-shaped projection will move radially inwardly into the notches N without turning.

With the wedge-shaped projection or lugs 40 and 42 wedged or locked in such notches N to prevent rotation between the circular members 11 and 12 when the pipes or tubular members P1 and P2 are rotated in a disconnecting direction, the grip of the knurled surface 18 and 19 on the shoulders S1 and S2, respectively, will be broken to thereby permit such tubular members to be loosened or rotated for disconnection without interference by the locking rings R.

In operation, the circular members 11 and 12 are placed on the base 14 of the pin 16 with the cam surfaces C interengaging or intermeshing with each other as shown in FIG. 1 of the drawings. Thereafter, the pin is inserted into the box portion of the tubular member P2 and the threads 17 connected with the female threads 22 and tightened to the torque required to cause the knurled surfaces 18 and 19 to grippingly engage the opposed shoulders S1 and S2, respectively. It will be appreciated that as the tubular members P1 and P2 are screwed together, the rings 11 and 12 will rotate so that the axially extending cam faces 26 engage each other as shown in FIGS. 1 and 2 as tightening thereafter continues.

Figure 3:
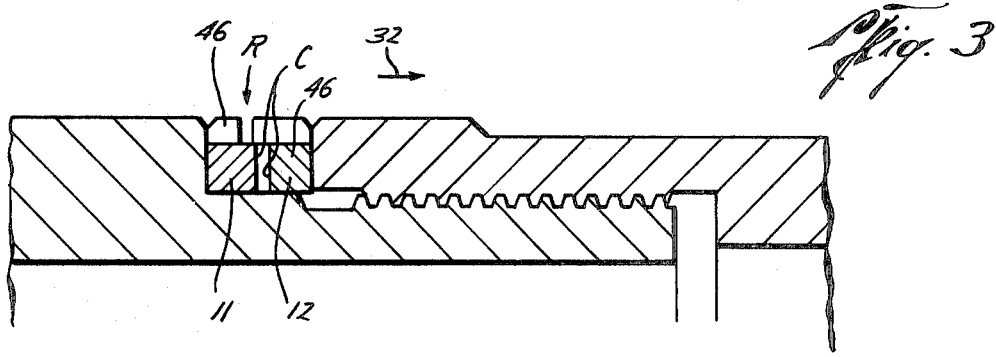
FIG. 3 is a partial sectional view of the threaded connection of FIG. 2 with the pipes and the locking rings rotated in the direction for disconnection and with the interengaging cam surfaces in an expanded position in which force is applied axially of such threaded portions.

In the event of partial loosening or disconnecting rotation between threads 17 and 22 as shown in FIG. 3 of the drawings, the cam surfaces C are caused to move axially as shown in FIGS. 4 and 5 of the drawings, causing the rings 11 and 12 to move or tend to move longitudinally or axially apart and thereby impart a thrust axially of the threads 17 and 22 in the direction of the arrow 34 to introduce forces into the threaded connections to thereafter resist further disconnecting rotation between such threaded members.

When it is desired to disconnect the threaded members P1 and P2 from each other, they are first turned in a tightening direction to bring the notched portions 11a and 12a and the notched portions 11b and 12b of the rings 11 and 12 into axial alignment with each other for receiving the wedge-shaped lugs or projections 40 and 42 on the breakout clamp K. When such wedge-shaped projections 40 and 42 are firmly inserted into the notches N in such rings 11 and 12, the threaded tubular members P1 and P2 may then be rotated in a disconnecting direction relative to each other and the wedge-shaped projections 40 and 42 will thereafter hold the rings 11 and 12 against rotation relative to each other and cause the gripping shoulders S1 and S2 to be dislodged, thereby freeing such tubular members for disconnecting rotation, unimpaired or unimpeded by the lockring assembly R.

The foregoing disclosure and description of the invention are illustrative and explanatory thereof, and various changes in the size, shape, and materials as well as in the details of the illustrated construction may be made without departing from the spirit of the invention.

What is claimed is:

1. A pipe-coupling apparatus for resisting disconnecting torque between adjoining thread-connected pipes in a drill sting including:
   a. two adjoining pipes having a direct threaded connection without tool joints therebetween and annular shoulders formed adjacent such thread connection;
   b. a lockring assembly comprising a pair of circular members disposed between said annular shoulders of said adjoining pipes;
   c. an external knurled surface on each of said circular members for gripping engagement with said annular shoulders when the threaded connection between said pipes is tightened;
   d. cam surfaces on the adjacent surfaces of said pair of circular members for urging said tubular members axially apart when said pipes are subjected to disconnecting torque relative to one another;
   e. said circular members having inner and outer diameters corresponding to the inner and outer diameters, respectively, of said annular shoulders; and
   f. a plurality of circumferentially disposed notches in said circular members adapted to receive means for holding said circular members against rotation relative to each other to permit disconnecting rotation of said tubular members.

2. The structure of claim 1, including:
   a. clamp means for engaging in said notches when said notches in said circular members are aligned with each other.

3. The structure set forth in claim 1, wherein:
   a. said annular shoulders are disposed laterally inwardly of the external surface of said pipes to form an annular recess for receiving said circular members; and
   b. said side surfaces of said circular members being substantially in alignment with the external surface of said pipes so that no substantial projection therefrom occurs which might interfere with movement of the pipes in a well bore or the like.

4. The structure of claim 1, wherein said cam surfaces include a plurality of interengaging inclined surfaces formed on said adjacent surfaces of said pair of circular members.

5. The structure of claim 1, wherein said cam surfaces include a plurality of interengaging inclined surfaces formed on said adjacent surfaces of said pair of circular members, said surfaces being inclined in the same direction but at a greater degree of pitch than the threads connecting said pipes.

6. The structure of claim 1, wherein each of said notches in the cylindrical side surfaces of said circular members has inclined sides and a transverse base, said notches being disposed on diametrically opposite sides of said circular members.

7. The structure set forth in claim 2, wherein said clamp means includes:
 a. a clamp having a lug adapted to be inserted into each of said notches; and
 b. means for releasably securing said lugs in said notches when aligned.

8. The structure of claim 2, wherein said clamp means includes:
 a. a clamp having a movable wedge-shaped lug and a fixed wedge-shaped lug adapted to be inserted into said notches to hold said circular members against disconnecting rotation relative to each other.